3,047,497
GREASES THICKENED WITH METAL SALTS OF CARBOXYALKYLPOLYSILOXANES
Ben A. Bluestein, Schenectady, N.Y., assignor to General Electric Company, a corporation of New York
No Drawing. Filed Aug. 15, 1960, Ser. No. 49,448
4 Claims. (Cl. 252—28)

The present invention relates to lubricating compositions and to a process for making them. More particularly, the present invention relates to the use of salts of carboxyalkylorganopolysiloxanes as thickeners for various base oils in the production of improved grease compositions.

Because of their superior thermal and oxidative stability, organopolysiloxane oils have been viewed by industry with increasing interest for high temperature lubricating applications. Although research has provided thickeners such as high melting lithium soaps for organopolysiloxane oils for the production of superior high temperature greases, organopolysiloxane greases generally suffer from a serious shortcoming. Inherent in the oils from which they are made, organopolysiloxane greases are often unable to provide a film under high unit pressure (extreme pressure lubricating conditions) which is sufficient to prevent metal to metal contact. This insufficiency has seriously limited the load carrying capacity of an otherwise superior high temperature organopolysiloxane grease and has interfered with the general acceptance of organopolysiloxane greases in applications requiring extreme pressure lubrication, such as is required in high speed and high load bearings.

It has now been discovered that certain carboxyalkylorganopolysiloxane salts are valuable thickening agents for various base oils, including high temperature organopolysiloxanes and mineral oils, which provide for the production of improved greases having superior load carrying capacity. In addition to serving as a thickener for base oils, the carboxyalkylorganopolysiloxane salts employed in the present invention have also been found to be valuable additives for increasing the load carrying capacity of conventional greases comprising organopolysiloxane or mineral oils thickened with alkali soaps or inorganic filler materials.

The carboxyalkylorganopolysiloxane salts that are employed in the present invention as thickeners or grease additives, hereinafter referred to as the "carboxyalkylpolysiloxane salts" can be represented by the formula:

(1) 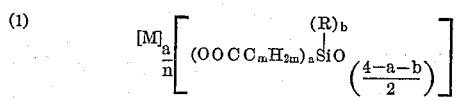

where M is a metal, $n$ represents the valence number of the metal and is an integer equal to from 1 to 4 inclusive, $a$ is equal to from 0.001 to 1.0, $b$ is equal to from 0 to 2.0, and the sum of $a$ and $b$ is equal to 1.00 to 2.5, $m$ is an integer equal to from 1 to 5, R is a member selected from the class of monovalent hydrocarbon radicals and halogenated monovalent hydrocarbon radicals.

There is provided by the present invention a grease composition comprising (a) 4 to 95 percent based on the weight of said grease composition of a base oil, (b) 5 to 96 percent based on the weight of said grease composition of a carboxyalkylpolysiloxane salt corresponding to Formula 1 and (c) from 0 to 35 percent based on the weight of said grease composition of a thickener selected from the class of inorganic fillers and metallic soaps.

Among the radicals represented by R of Formula 1 are aromatic and chloroaromatic, such as phenyl, chlorophenyl, tolyl, naphthyl, etc.; aliphatic and chloroaliphatic such as alkyl, cycloalkyl, chloroalkyl, alkenyl and alkynyl, particularly, methyl, ethyl, propyl, butyl, cyclohexyl, chloroethyl, vinyl, allyl, etc. R can be all the same radical or R can be a mixture of any one or more of said radicals. R is preferably methyl, phenyl and chlorophenyl.

The carboxyalkylpolysiloxane salts of Formula 1 are prepared from the corresponding carboxyalkylorganopolysiloxanes, hereinafter referred to as the "carboxyalkylpolysiloxanes," by interaction with a metallic compound in accordance with well known procedures of the art, such as by neutralization of the carboxyalkylsiloxane with an appropriate base, such as sodium hydroxide when sodium salts are desired. Many of these salts are described and claimed in my copending application Serial No. 49,429, filed August 15, 1960, and assigned to the same assignee as the present application. This copending application is hereby incorporated by reference into the present application for additional disclosure of the nature of and methods of formation of the salts of Formula 1.

The carboxyalkylpolysiloxanes that are utilized in the practice of the present invention to prepare the carboxyalkylpolysiloxane salts of Formula 1 can be made by the procedure illustrated in French Patent 1,158,808. Other methods are shown in Patent 2,900,363—Bluestein, which describes the preparation of carboxyalkylpolysiloxanes by hydrolyzing the corresponding cyanoalkylchlorosilanes alone or with other alkylchlorosilanes. Cyanoalkylchlorosilanes can be synthesized by the methods shown in French Patent 1,118,500 and U.S. Patent 2,913,472—Prober. The carboxyalkylpolysiloxanes can be illustrated by formula:

(2) 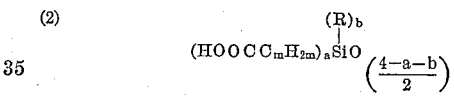

where R, $a$, $b$ and $m$ are as defined above.

The carboxyalkylpolysiloxanes of Formula 2, preferably contain the following carboxyalkylsiloxy units (3) 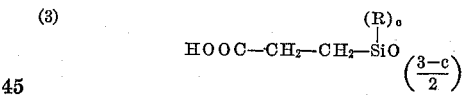

intercondensed with one or more of the following siloxy units (4) 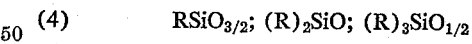

where $c$ is a whole number equal to from 0 to 2 inclusive, and R is as defined in Formula 1. The carboxyalkylsiloxy units represented by Formula 3 can be present in the carboxyalkylpolysiloxane of Formula 2 in the range of 1 to 100 mol percent, based on the total number of siloxy units contained in said carboxyalkylpolysiloxane, said siloxy units being characterized by having organo radicals attached to silicon by carbon-silicon linkages and having an average ratio of 1 to 3 organo radicals per silicon atom.

M of Formula 1 can be further described as the metallic component of a metallic compound that is capable of forming a salt with the carboxyalkylpolysiloxanes of Formula 2. The above-mentioned metallic compound can be illustrated by the formula:

(5) 

where M is as defined above and Z is an inorganic or organic anion.

M in Formula 5 can be further illustrated by metals in groups I, IIa, IIb, IIIa, IVa, IVb, VIIb and VIII of the periodic table. Preferably M is sodium, lithium, potassium, magnesium, calcium strontium, barium, beryllium titanium, zirconium, manganese, iron cobalt, nickel, copper, zinc cadmium, aluminum, tin, lead or antimony. Z in Formula 5 can be further illustrated by anions derived from carboxylic acids having from 1 to 20 carbon atoms halogen acids, nitrogen containing acids, sulfur containing acids, alcohols, mercaptans and other organic compounds containing active hydrogens. Z can be more particularly acetate, chloride, alkoxide, sulfate, nitrate, hydroxide, carbonate, acetylacetonate, octoate, oxide, etc.

The base oils that can be blended with the carboxyalkylpolysiloxane salts to prepare the novel improved grease compositions include mineral oils having a viscosity between about 150 to 2,000 S.S.U. and a viscosity index between about 40 and 100. In addition, the carboxyalkylpolysiloxane salts can be used as thickeners for organopolysiloxane oils corresponding to the formula:

(6) 

where R' is a member selected from the class of monovalent hydrocarbon radicals, halogenated monovalent hydrocarbon radicals and cyanoalkyl radicals and $d$ has a value equal to from 2.01 to 2.5.

Many of the organopolysiloxanes of Formula 6 are shown in Patents 2,469,888 and 2,469,890 — Patnode. The organopolysiloxanes of Formula 6 can be more particularly described as triorganosilyl chain-stopped linear or branched-chain organopolysiloxanes where the organo groups correspond to the R' group in Formula 6. R' is preferably methyl, phenyl, tetrachlorophenyl and cyanoethyl radicals and 50 to 75 percent of the total number of R' radicals are preferably methyl.

As mentioned above, the carboxyalkylpolysiloxane salts can be used alone as thickeners for various base oils or can be used in combination with other conventional thickeners. Conventional thickeners that can be employed in combination with the carboxyalkylpolysiloxane salts of Formula 1 in preparing the improved grease compositions of the present invention are inorganic filler materials such as finely divided inorganic solids such as natural clays, carbon black, silica and various metal oxides. In addition, metallic soaps, such as alkali stearates, octoates, etc. can also be employed.

The preparation of the improved grease compositions of the present invention can be accomplished by merely blending the carboxyalkylpolysiloxane salt (alone or with a conventional thickener) with a suitable base oil in accordance with well known grease making procedures. For example, the components can be blended by employing a grease mill at temperatures in the range of 25° C. to 250° C.

The following examples are given by way of illustration and not by way of limitation to illustrate to those skilled in the art the practice of the present invention. All parts are by weight.

Methyl-β-cyanoethyldichlorosilane prepared in accordance with the Prober Patent 2,913,742, was hydrolyzed in concentrated boiling hydrochloric acid, following the teaching of Bluestein 2,900,363, to produce a hydrolyzate consisting of methyl-β-carboxyethylsiloxane units.

A mixture of 264 parts of the above hydrolyzate, 329 parts of octamethylcyclotetrasiloxane and 8.2 parts of hexamethyldisiloxane was equilibrated in the presence of 100 parts of concentrated sulfuric acid. The product was stripped at .1 mm. and there was obtained a liquid carboxyalkylpolysiloxane containing 30 mol percent of $(HOOCCH_2CH_2)(CH_3)SiO$ units based on the total number of siloxy units in the carboxyalkylpolysiloxane, with the remaining units being dimethyl and trimethyl siloxane units.

The potassium salt of this liquid carboxyalkylpolysiloxane was prepared by mixing together 40 parts of the carboxyalkylpolysiloxane and 10 parts of solid potassium hydroxide and warming the mixture. The resulting product was dissolved in 100 parts of water and the solution was mixed with 17 parts of calcium chloride dissolved in 100 parts of water. After the resulting mixture was boiled for several hours a rubbery, wax-like solid was obtained. The product was further dried at 100° C. for three hours and twenty-five parts of the residue was recovered. This residue was the calcium salt of the carboxyalkylpolysiloxane.

Example 1

The calcium salt prepared above was blended with organopolysiloxane fluids in various proportions in a standard grease mill. The load carrying capacity of the various greases were determined by the Standard Navy Gear Wear Test, Specification MIL-G-3278. The wear of a standard gear in terms of weight loss in milligrams per 1,000 cycles was determined after 5,000 cycles under a five pound load and after 3,000 cycles under a ten pound load. Two organopolysiloxane fluids were used as the base fluid for the greases of this example. The first fluid, a "tetrachlorophenyl fluid" had a viscosity of about 40 centistokes at 25° C. and consisted of about 4 mol percent tetrachlorophenyl siloxane units, about 88 mol percent dimethylsiloxane units and about 8 mol percent trimethylsiloxane units. The second fluid, a "methylphenyl fluid," had a viscosity of about 120 centistokes at 25° C. and was a trimethyl silyl chain-stopped copolymer of dimethylsiloxane units and diphenylsiloxane units containing an average of 6.7 dimethylsiloxane units per diphenylsiloxane unit. A control grease was prepared which consisted of 30 parts of lithium octoate in 70 parts of the tetrachlorophenyl fluid. In Table I below are shown the compositions of greases within the scope of the present invention which contained the calcium salt of the carboxyalkylpolysiloxane disclosed above and the tetrachlorophenyl fluid or methylphenyl fluid. The table also lists the gear wear in milligrams per 1,000 cycles in the gear test.

TABLE I

| Fluid | Parts Fluid | Parts Calcium Salt | Wear (mg./1,000 cycles) | |
|---|---|---|---|---|
| | | | 5 lb. load, 5,000 cycles | 10 lb. load, 3,000 cycles |
| Tetrachlorophenyl | 31 | 29 | 1.2 | 1.7. |
| Do | 15.5 | 16 | 1.2 | 5.4. |
| Methylphenyl | 36 | 33 | 0.3 | 6.4. |
| Control | | | 4 | Failed. |

As shown in Table I above each of the greases which contained the calcium salt of the carboxyalkylpolysiloxane exhibited substantially less wear than the control which contained lithium stearate instead of the calcium salt. In fact, the control grease could not even be subjected to the gear test under the 10 pound load for the full 3,000 cycles since the gear teeth were so badly worn that the gears would not mesh.

Example 2

This example illustrates a grease composition comprising a silicone fluid and both a carboxyalkylpolysiloxane salt and a conventional grease thickener, lithium octoate. The silicone fluid employed in this example for both the grease of the present invention and the control was the tetrachlorophenyl fluid used in Example 1. The calcium salt was the same calcium salt employed in Example 1. In Table II below are presented the composition of the grease within the scope of the present invention and the composition of the control together with the wear data obtained in the gear test.

TABLE II

| Parts Fluid | Parts Calcium Salt | Parts Lithium Octoate | Wear (mg./1,000 cycles) | |
|---|---|---|---|---|
| | | | 5 lb. load, 5,000 cycles | 10 lb. load, 3,000 cycles |
| 19 | 5 | 6 | 1.8 | 11. |
| 70 | ¹0 | 30 | 4 | Failed. |

¹ Control.

As shown in Table II above, the grease composition containing both the calcium salt and lithium octoate was markedly superior to a similar grease composition from which the calcium salt was omitted. The word "failed" in Table II indicates that the wear of the gear teeth was so severe that the test could not be run for the full 3,000 cycles under the 10 pound load.

The examples clearly show the marked improvement in load carrying capacity of the grease compositions containing the carboxyalkylpolysiloxane salts of the present invention over the control. In addition, the carboxypolysiloxane salt compositions of the present invention are also found to improve the load carrying capacity of soap filled mineral oil greases compared to the control composition.

While the foregoing examples have of necessity been directed to only a few of the very many variables within the scope of the present invention, it should be understood that the present invention covers the use of a broad class of carboxyalkylpolysiloxane salt compositions illustrated by Formula 1 and numerous other organopolysiloxane and mineral oil grease compositions.

What I claim as new and desire to secure by Letters Patent of the United States is:

1. A grease composition comprising (*a*) 4 to 95 percent based on the weight of said grease composition of a base oil selected from the class consisting of a mineral oil, and an organopolysiloxane oil (*b*) 5 to 96 percent based on the weight of said grease composition of a carboxyalkylpolysiloxane salt corresponding to the formula:

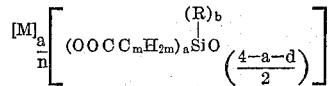

where M is a metal, *n* represents the valence number of the metal and is an integer equal to from 1 to 4 inclusive, *a* is equal to .001 to 1.0, *b* is equal to 0 to 2.0, and the sum of *a* and *b* is equal to 1.00 to 2.5, *m* is an integer equal to from 1 to 5, and R is a member selected from the class consisting of monovalent hydrocarbon radicals and halogenated monovalent hydrocarbon radicals, and (*c*) from 0 to 35 percent based on the weight of said grease composition of a thickener selected from the class consisting of inorganic fillers and metallic soaps.

2. The grease composition in accordance with claim 1, where M is calcium.

3. The grease composition in accordance with claim 1, where M is lithium.

4. A process for making an improved grease composition comprising mixing together at a temperature in the range of from 25° C. to 250° C. a base oil selected from the class consisting of a mineral oil, and an organopolysiloxane oil and a salt of a carboxyalkylpolysiloxane corresponding to the formula:

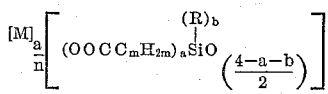

where M is a metal, *n* represents the valence number of the metal and is an integer equal to from 1 to 4 inclusive, *a* is equal to .001 to 1.0, *b* is equal to 0 to 2.0, and the sum of *a* and *b* is equal to 1.00 to 3, *m* is an integer equal to from 1 to 5, and R is a member selected from the class consisting of monovalent hydrocarbon radicals and halogenated monovalent hydrocarbon radicals and from 0 to 35 percent based on the weight of said grease composition of a thickener selected from the class consisting of inorganic fillers and metallic soaps.

References Cited in the file of this patent

UNITED STATES PATENTS

| | | |
|---|---|---|
| 2,446,177 | Hain | Aug. 3, 1948 |
| 2,705,700 | Iler | Apr. 5, 1955 |
| 2,721,856 | Sommer | Oct. 25, 1955 |
| 2,833,802 | Merker | May 6, 1958 |
| 2,891,980 | Gilbert et al. | June 23, 1959 |
| 2,907,783 | Kerschner et al. | Oct. 6, 1959 |
| 2,957,899 | Black et al. | Oct. 25, 1960 |